United States Patent
Magnone et al.

(10) Patent No.: US 8,005,018 B2
(45) Date of Patent: Aug. 23, 2011

(54) SYSTEM AND METHOD FOR THE QUALITY STATUS ANALYSIS OF AN ACCESS NETWORK SUPPORTING BROADBAND TELECOMMUNICATION SERVICES

(75) Inventors: Lorenzo Magnone, Turin (IT); Giuseppe Covino, Turin (IT)

(73) Assignee: Telecom Italia S.p.A., Milan (IT)

( * ) Notice: Subject to any disclaimer, the term of this patent is extended or adjusted under 35 U.S.C. 154(b) by 557 days.

(21) Appl. No.: 10/593,969

(22) PCT Filed: Mar. 23, 2004

(86) PCT No.: PCT/IB2004/000849
§ 371 (c)(1),
(2), (4) Date: Jul. 16, 2007

(87) PCT Pub. No.: WO2005/094001
PCT Pub. Date: Oct. 6, 2005

(65) Prior Publication Data
US 2007/0286084 A1   Dec. 13, 2007

(51) Int. Cl.
  *H04L 12/28* (2006.01)
(52) U.S. Cl. ....................... 370/255; 370/252
(58) Field of Classification Search .................. 370/224, 370/241, 9.04, 229–235, 464, 468, 469, 470, 370/472, 476, 477, 478, 485, 506, 508, 252–255, 370/353; 398/45, 46, 66, 74, 2, 115, 116; 379/1.01, 9.04, 14.01, 15.01, 32.01; 709/45, 709/46, 66, 74, 82, 115, 116
See application file for complete search history.

(56) References Cited

U.S. PATENT DOCUMENTS
5,729,370 A * 3/1998 Bernstein et al. ............... 398/66
(Continued)

FOREIGN PATENT DOCUMENTS
WO   WO-01/13609 A1   2/2001

OTHER PUBLICATIONS
"Physical Layer Management for Digital Subscriber Line (DSL) Transceivers"; Telecommunication Standardization Sector of ITU, International Telecommunication Union, ITU-T, G.997.1, Series G: Transmission Systems and Media, Digital Systems and Networks, Digital Systems and Networks, Digital Sections and Digital Line System—Access Networks, 63 pages, (May 2003).

(Continued)

*Primary Examiner* — Andrew Lai
(74) *Attorney, Agent, or Firm* — Finnegan, Henderson, Farabow, Garrett & Dunner, L.L.P.

(57) ABSTRACT

A system for the quality status analysis of an access network of a fixed network infrastructure. The access network has a plurality of cables, a set thereof supporting broadband transmissive systems. The analysis system is configured repeatedly to draw from remote positions, static network information stored in the first data sources, and dynamic network information, relating to the broadband transmissive systems, from second data sources; and has an information processing module configured to collect the static and dynamic network information from the information acquisition module, and process the static and dynamic network information from the information acquisition module, and process the static and dynamic network information to obtain an index representing the quality status of the access network. In particular, the dynamic network information is linked to measurements taken during transmission on the broadband systems that are already installed and active in the network.

20 Claims, 6 Drawing Sheets

U.S. PATENT DOCUMENTS

| | | | |
|---|---|---|---|
| 6,016,311 A * | 1/2000 | Gilbert et al. | 370/280 |
| 6,266,395 B1 | 7/2001 | Liu et al. | |
| 6,324,184 B1 * | 11/2001 | Hou et al. | 370/468 |
| 6,469,986 B1 * | 10/2002 | Lecheler et al. | 370/252 |
| 6,556,659 B1 * | 4/2003 | Bowman-Amuah | 379/9.04 |
| 7,126,914 B2 * | 10/2006 | Blackburn | 370/233 |
| 7,142,512 B1 * | 11/2006 | Kobayashi et al. | 370/232 |
| 2003/0126256 A1 * | 7/2003 | Cruickshank et al. | 709/224 |
| 2005/0163128 A1 * | 7/2005 | Blackburn | 370/395.21 |

OTHER PUBLICATIONS

"Asymmetric Digital Subscriber Line (ADSL) Transceivers—2 (ADSL2)"; Telecommunication Standardization Sector of ITU, International Telecommunication Union, ITU-T, G.992.3, Series G: Transmission Systems and Media, Digital Systems and Networks, Digital Sections and Digital Line System—Access Networks, pp. 1-292, (Jul. 2002).

"Spectrum Management for Loop Transmission Systems"; American National Standard for Telecommunications; Issue 2, ANSI T1E1.4, pp. I, ii, iii, and 62, (2002).

* cited by examiner

SYSTEM AND METHOD FOR THE QUALITY STATUS ANALYSIS OF AN ACCESS NETWORK SUPPORTING BROADBAND TELECOMMUNICATION SERVICES

CROSS REFERENCE TO RELATED APPLICATION

This application is a national phase application based on PCT/IB2004/000849, filed Mar. 23, 2004, the content of which is incorporated herein by reference.

BACKGROUND OF THE INVENTION

1. Field of the Invention

The present invention generally relates to the provision of high speed telecommunication services. In particular, the present invention relates to a system and a method for the quality status analysis of an access network of a fixed network supporting broadband telecommunication services. More in particular, the present invention relates to a system and a method for the quality status analysis of a Copper Access Network supporting broadband services based on a xDSL technology ("generic Digital Subscriber Line").

2. Description of the Related Art

The exponential increase in the popularity of the Internet and of related data services has prompted service providers in the Public Switched Telephone Network (PSTN), to seek new technologies to deliver high speed data services to their customers. One solution is provided by DSL (Digital Subscriber Line) technologies. Several DSL technologies offer high speed services over existing copper facilities commonly referred to "subscriber loops". Such technologies include ADSL ("Asymmetrical Digital Subscriber Line"); HDSL ("High-bit-rate Digital Subscriber Line"); RDSL ("Rate Adaptive Digital Subscriber Line"); SDSL ("Symmetric Digital Subscriber Line"); and VDSL (very High-speed Digital Subscriber Line"). These DSL or similar technologies are collectively known as "xDSL" services.

A problem encountered in the provision of xDSL services is that subscriber loops have largely been neglected from a technology upgrade perspective. Existing subscriber loops and the structure of the copper distribution network were originally designed for narrow band voice telephony and not to support high speed data services. Consequently, the electrical characteristics of the cables and subscriber loops set limits to the provision of broadband services: for example, many subscriber loops include wire gauge changes and bridged taps (unused extension lines) which limit the available bandwidth, limiting the performance of the loops with respect to the delivery of an xDSL service.

U.S. Pat. No. 6,266,395 discloses a method and an apparatus for single-ended qualification of subscriber loops for xDSL services. The method involves first screening a subscriber loop database for disqualifying devices or services, associated with that loop, which are incompatible with xDSL services. If none are found, a set of predetermined electrical characteristics of the subscriber loop are derived from information in the database, or directly measured using test equipment at a central office end of the subscriber loop. The electrical characteristics are used to calculate an available bandwidth for xDSL services on the subscriber loop.

WO 01/13609 teaches loop qualification methods and systems for qualifying an ADSL loop which involve evaluating Loop Make-Up (LMU) data to determine whether loops are qualified for certain services, such as ADSL services or other digital services. The LMU data includes such information as whether the loop is comprised of copper, fibre, it is a DLC ("Digital Loop Carrier"), its length, resist zone, carrier zone, loading factor, the existence of a DAML ("Digital Added Main Line") and taper code information. The loop qualification methods and systems obtain LMU data on existing loops as well as information on loops which have not yet been completed. Network service providers (NSP) interface with the loop qualification systems to determine whether certain lines are qualified for a service. Loop qualification systems also include web-based interfaces to allow both NSPs and end users to make an inquiry as to the capability of a given loop.

The Applicant has observed that a network operator's ability to obtain a degree of knowledge that is punctual, updated and evolving over time of the potential of its own access network critically depends on the ability to integrate and mutually correlate information about the structure of the network, the number and type of systems installed thereon and the transmissive characteristics of the network itself. Whilst network structure and the number and type of installed systems are typically described in appropriate databases (Network Inventory) normally contained and updated within computerised databases, the transmissive characteristics of the network are generally not available locally but only on a statistical basis as the national or regional level.

In particular, the transmissive characteristics of the copper network do not depend only on the physical characteristics (e.g. the electrical capacity) and topological characteristics (e.g. the length) of the single subscriber loop, but also on the degree of electromagnetic coupling between the loop and the surrounding environment. In particular, in the case of the xDSL transmission systems using bandwidth bands from a few kHz to a few tens of MHz, the actual transmissive capacity available on the loop supporting the xDSL services is also limited by the other transmissive systems (homologous or "legacy", for instance HDB3 or ISDN-BA) operating on the loops present in the same cable sector, whose transmitted signals, by proximity effect, are coupled by crosstalk on the loop in question, constitute a significant interference to the transmission.

SUMMARY OF THE INVENTION

The Applicant faced the problem of providing a network operator with a measurement that is punctual, updated and evolving over time of the quality status of its access network without requiring the installation of specific measuring tools at the central office of the access network itself.

The Applicant has observed that, providing a system and a method for the quality status analysis of an access network of a fixed network supporting broadband telecommunication services which acquires network information both from the services that are already installed and active on the network and from the network inventory, a network operator can be provided with punctual indexes of the quality status of its access network.

In particular, the Applicant has observed that the problem described above can be solved by a system and related method for the quality status analysis of an access network of a fixed network infrastructure supporting broadband telecommunication services comprising an information acquisition module configured for drawing static network information stored in network inventories and dynamic network information linked to measurements made during transmission on the broadband systems already installed and active in the network. The system further comprises an information processing module configured for collecting said static and dynamic network information and processing them to obtain at least an index representative of the quality status of the access network.

More specifically, a system for the quality status analysis of an access network of a fixed network infrastructure, said access network comprises a plurality of cables, a set thereof supporting broadband transmissive systems, comprises:
- an information acquisition module configured for drawing static network information stored in first data sources and dynamic network information, relating to said broadband transmissive systems, from second data sources; and
- an information processing module configured for:
  - collecting said static and dynamic network information from said information acquisition module; and
  - processing said static and dynamic network information to obtain at least one index representing said quality status of said access network.

Another aspect of the present invention relates to a method for the quality status analysis of an access network of a fixed network infrastructure, said access network comprising a plurality of cables, a set thereof supporting broadband transmissive systems, said method comprising the steps of:
- accessing said first data sources to draw static network information stored in said first data sources;
- accessing said second data sources to draw dynamic network information associated to said broadband transmissive systems; and
- processing said static and dynamic network information to obtain at least one index representing said quality status of said access network.

A further aspect of the present invention relates to a computer product able to be loaded into the memory of at least an electronic computer and comprising portions of software code to implement the method according to the invention when the product is executed on a computer: in this context, said term must be considered wholly equivalent to the mention of a computer readable means comprising instructions for controlling a computer network to implement a method according to the invention. Reference to "at least an electronic computer" is destined to highlight the possibility of implementing the solution according to the invention in a decentralised context.

Additional preferred aspects of the present invention are described in the dependent claims and in the present description.

BRIEF DESCRIPTION OF THE DRAWINGS

The features and the advantages of the present invention shall become readily apparent from the description that follows, of an embodiment provided purely by way of non limiting indication with reference to the accompanying drawings, in which.

DETAILED DESCRIPTION OF THE INVENTION

Figure 1:
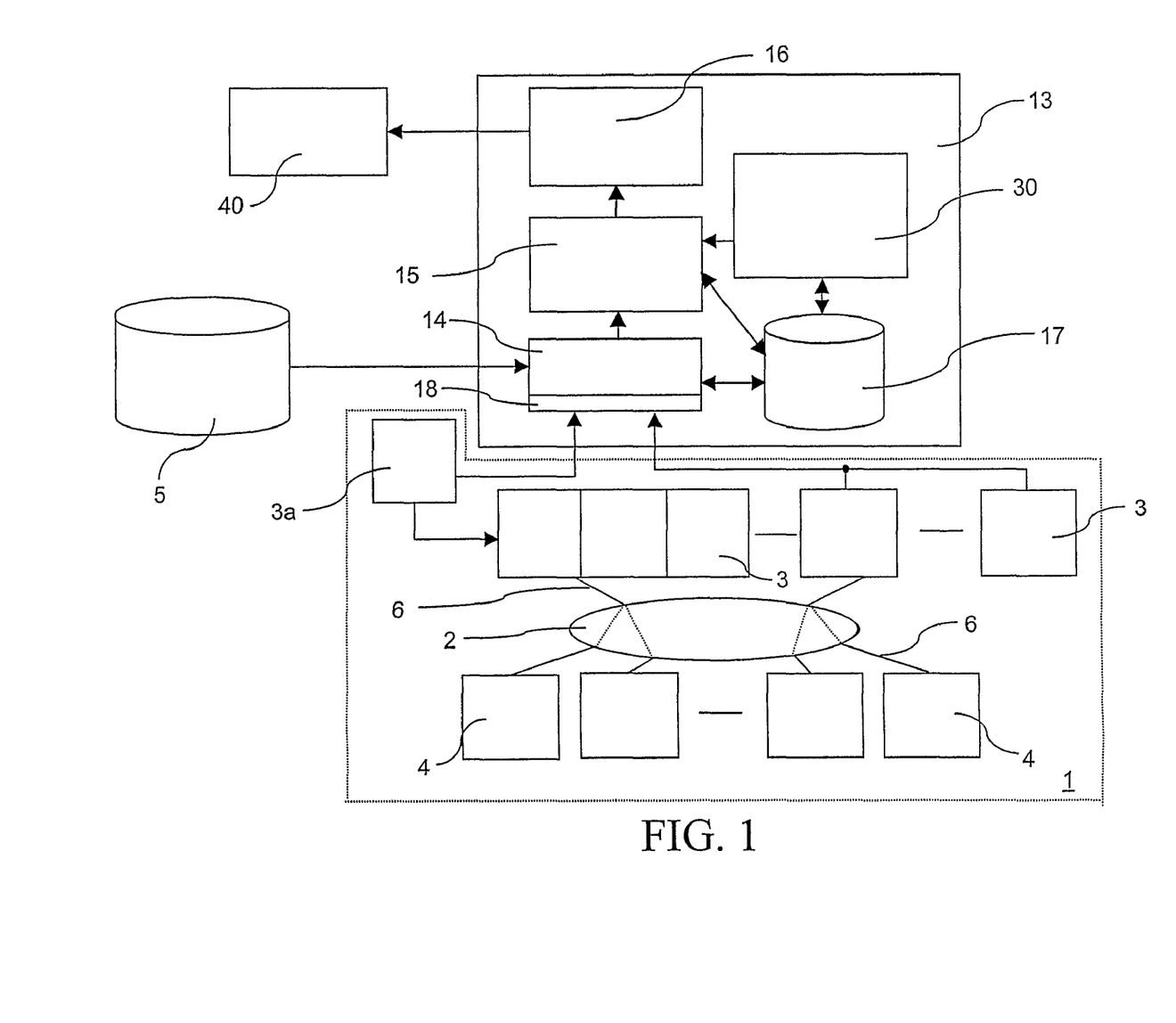
FIG. 1 is a schematic representation of a fixed network infrastructure and of an analysis system according to the invention operating on said fixed network infrastructure.

With reference to FIG. 1, the analysis system according to the invention operates on a fixed network infrastructure 1 comprising: an access network 2, network apparatuses 3 (e.g. central office or cabinets, remote with respect to the central office) and user equipment 4 (for example, electronic computers provided with transceivers xDSL, telephones, gateway etc.). The fixed network infrastructure 1 can also comprise a plurality of management modules 3a ("Element Manager"), each one including a program to configure and control multiple network apparatuses 3 associated thereto. The presence or absence of the management modules 3a depends on the specific network apparatus 3.

The access network 2, for example made of copper, includes a plurality of cables 6 to connect the user equipment 4 to the network apparatuses 3.

Each cable 6 comprises a primary link 6a including a plurality of subscriber loops ("pairs") 7 (see FIG. 2), a set thereof supporting broadband transmissive systems, for example of the xDSL type. Broadband transmissive systems imply a high speed data transmission between the network apparatuses 3 and the user equipment 4.

Figure 2:
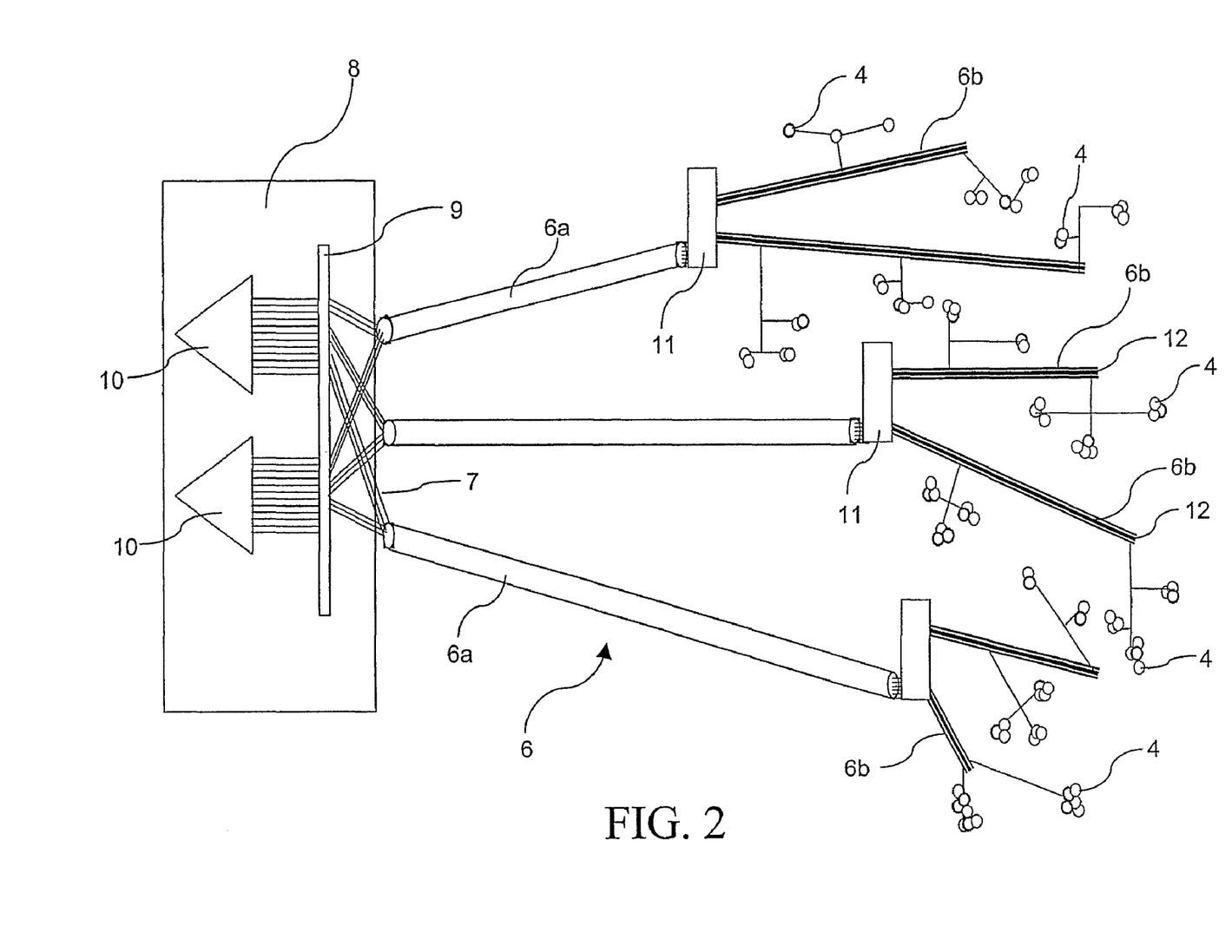
FIG. 2 shows an embodiment of an access network of the fixed network infrastructure of FIG. 1.

With reference now to FIG. 2, each network apparatus 3 can for example include a central office 8, comprising a Main Distribution Frame 9 (MDF) into which converge the subscriber loops 7, connected to that central office, and multiplexers 10, so-called DSLAMs ("Digital Subscriber Line Access Multiplexer"), mutually connected through the Main Distribution Frame 9 and configured for managing the data/voice traffic coming from the subscriber loops 7.

Moreover, each cable 6 can also comprise secondary links 6b connecting branching and flexibility points provided for example by cabinets 11 and by boxes 12. To each cabinet 11 can be connected multiple boxes 12. To each box 12 can then be connected multiple user equipment items 4 whereto are associated different types of xDSL or voice services.

As shown in FIG. 1, to the analysis system of the invention are also associated network inventories 5 in which is stored static network information comprising, for example:
- structural information such as:
  - information about the access network structure 2 which, for each network apparatus 3, can comprises: typology and capacity of the cables outgoing from the network apparatus; length of the primary links of the cables; number and location (address) of the branching and flexibility points along the cables; for each pair supporting a broadband transmissive system outgoing from the network apparatus: the position of the pair inside the related cable; its connection to the main distribution frame; the type of broadband service (e.g. ADSL) supported;
  - information about the structure of the cable areas of the access network 2 where the broadband transmission systems operate. This information can for example include: typology of the multi-pair cable; diameter of the pairs; type of insulation; capacity (number of constituting pairs);
  - information about homologous or "legacy" transmission systems (for example HDB3, ISDN-BA) installed, and their location within the cable areas (e.g. the pair occupied within which cable); and
  - toponomastic information (e.g. the address or geo-referencing of an operator or customer site) of the customer base installed or potentially installable in the cable areas under consideration.

With reference to FIG. 1, the analysis system of the invention, designated by the number 13, comprises an information acquisition module 14, an information processing module 15, an interface module 16 with a network operator 40, a network and transmissive systems model 30 and a database 17.

More in detail, the information acquisition module 14 is configured for collecting network information both from the broadband transmissive systems that are already installed and active in the network and from the network inventories 5.

Specifically, the information acquisition module 14, through a remote access to the network apparatuses 3, can collect dynamic network information linked to measurements taken during transmission on the broadband systems that are already installed and active in the network. Access to the network apparatuses 3 can occur directly or, if present, through the management modules 3a. This dynamic information comprises transmissive parameters which can for example include:

- operating parameters relating to the physical layer of the subscriber loops supporting the broadband transmissive systems: in particular, for both the downstream and upstream transmission directions, the current bit rate (kbit/s), the maximum possible bit rate (kbit/s), the signal to noise ratio margin (SNR Margin, dB) of operation, the attenuation of the transmitted signal (dB). Where available, for example as provided by the advances in ITU-T G.997.1 standard implementations, the values of these parameters can be available at specific frequencies (or tones) thanks to dual ended line testing (delt) functionalities defined in the ITU-T G.992.3 standard for ADSL data transmission lines and subsequent extensions or revisions;
- status or value of the counters relating to physical layer performance, such as Loss of Frames, Loss of Signal, Loss of Power, Code Violations, Forward Error Corrections, Discarded Header Cells for Error Violation etc.

Figure 3:
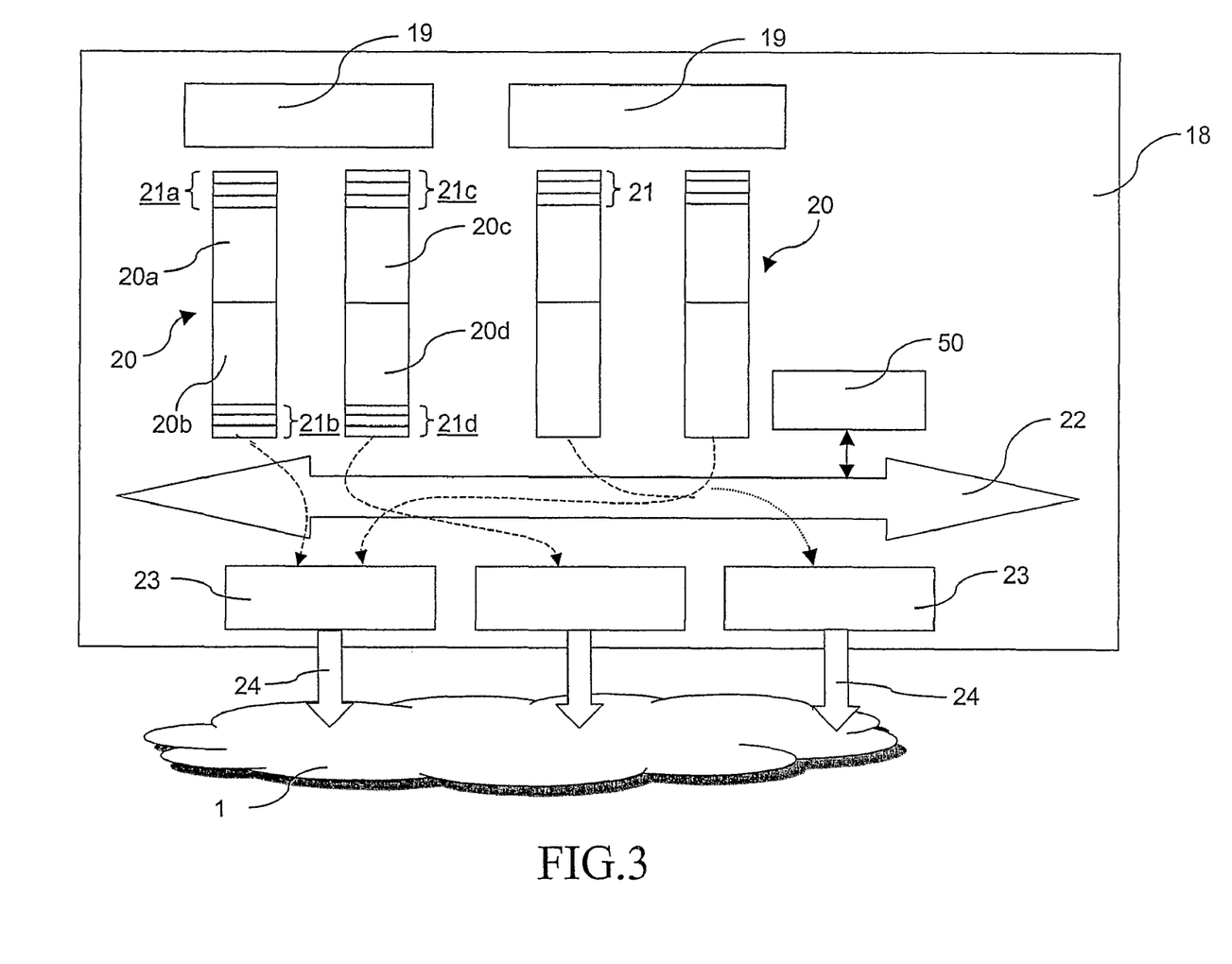
FIG. 3 is a schematic representation of the data acquisition portion of the analysis system of FIG. 1.
Figure 4:
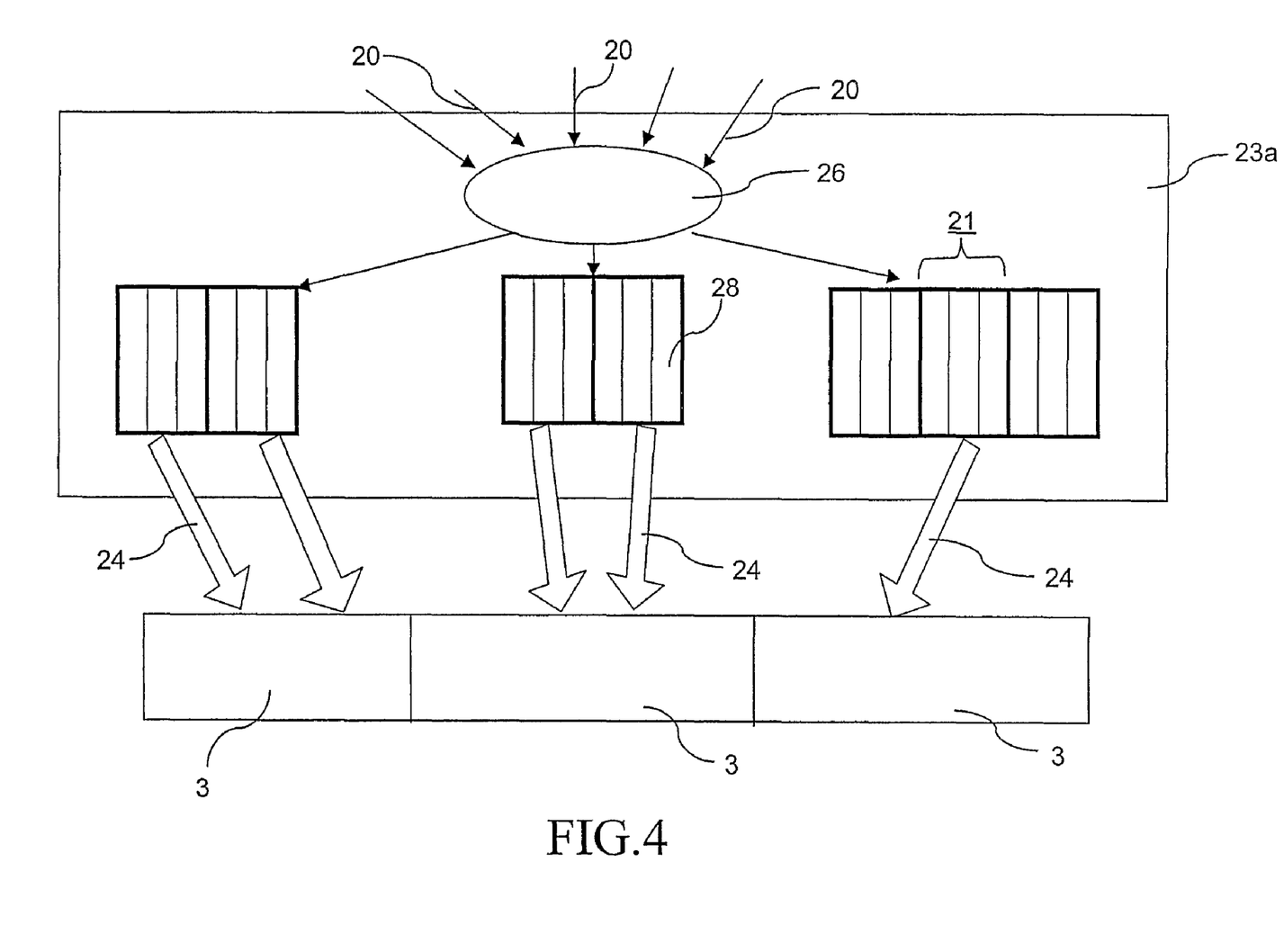
FIG. 4 is a schematic representation of a particular module of the data acquisition portion of FIG. 3.
Figure 5:
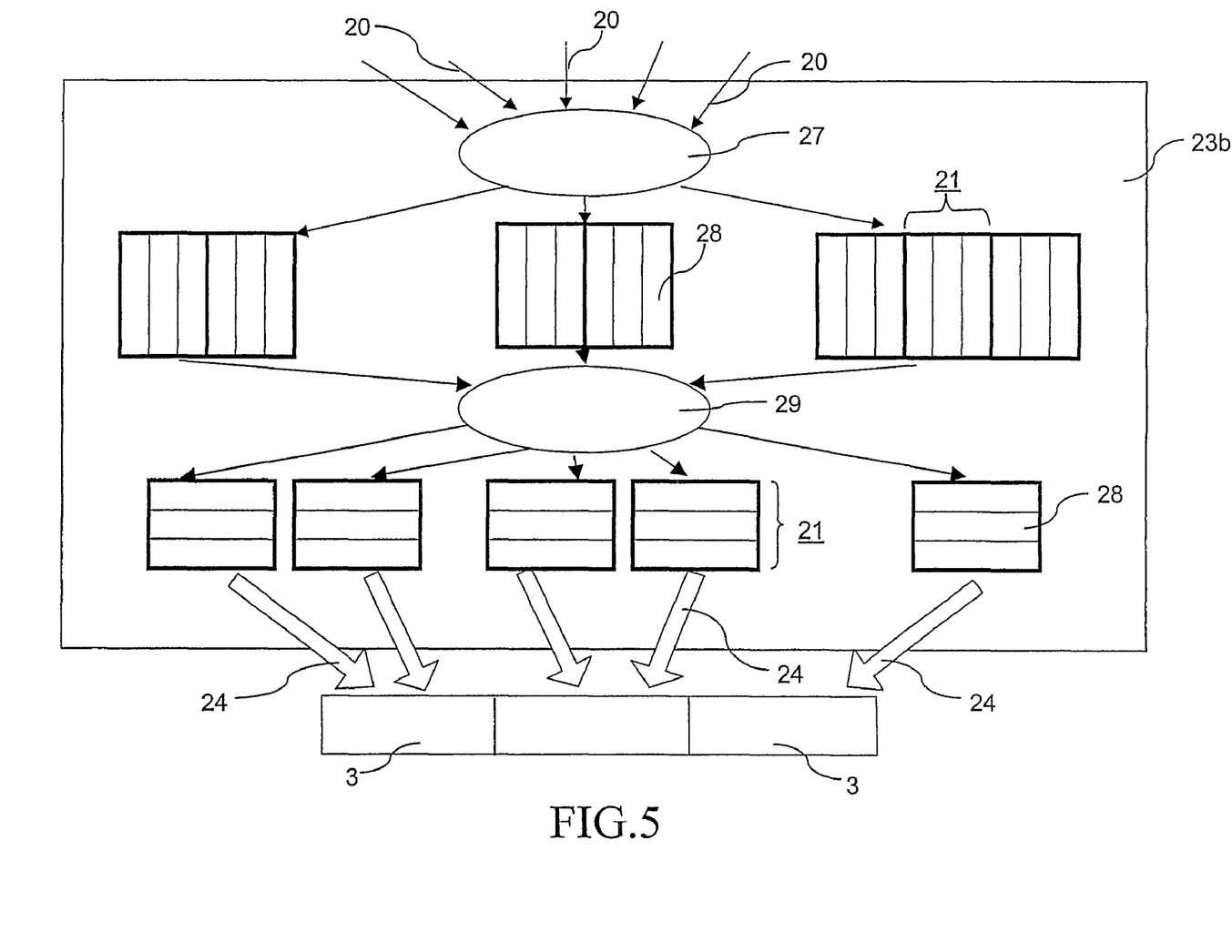
FIG. 5 is a schematic representation of an additional module of the data acquisition portion of FIG. 3.

In detail, the information acquisition module 14 for remote access to the network apparatuses 3 comprises a data access portion 18, schematically shown in FIGS. 3, 4 and 5.

In this data access portion 18 the acquisition of the transmissive parameters set out above is achieved through the creation of "tasks" 19 which can be performed simultaneously.

In detail, each "task" 19 is a programmed sequence, independent from the others, of measurement commands to be sent to the network apparatuses 3 to acquire the transmissive parameters of interest. Each "task" 19 can for example comprise:

- a scheduling specifying the time intervals in which the "task" is to be carried out;
- a priority with respect to the other "tasks"; and
- a parallelism level corresponding to a number N of parallel sessions in which the commands of the "task" can be subdivided, for example using a geographic-spatial partitioning.

As shown more in detail in FIG. 3, each "task" 19 is subdivided into one or more sessions 20, which are performed in parallel for a more efficient and flexible use of the resources. Each session 20 contains blocks of measurement request commands 21 to be sent to network apparatuses 3 serving a specific geographic area. For example, a session 20 can be subdivided into a first and second sub-session 20a, 20b: the first sub-session 20a containing blocks of commands 21a to be sent to network apparatuses 3 positioned in a first geographic area A (for example, the network apparatuses 3 serving the North Milan area); the second sub-session 20b containing blocks of commands 21b to be sent to network apparatuses 3 positioned in a second geographic area B (for example, the network apparatuses 3 serving the South Milan area). A further session 20 can be subdivided into a first and second sub-session 20c, 20d: the first sub-session 20c containing blocks of commands 21c to be sent to network apparatuses 3 positioned in a third geographic area C (for example the network apparatuses 3 serving the East Milan area); the second sub-session 20d containing blocks of commands 21d to be sent to network apparatuses 3 positioned in a fourth geographic area D (for example the network apparatuses 3 serving the West Milan area). In particular, each blocks of commands 21 relates to a single network apparatus 3 and multiple blocks of commands 21 can relate to a same network apparatus 3.

Operatively, for each block of commands 21, the related session 20 queries an adaptive controller 50 which determines to which network apparatus 3 the specific blocks of commands 21 must be sent, through a communication bus 22 and with which priority.

More in detail, each block of commands 21 is sent to the related network apparatus 3 through a handler 23. Each handler 23 is a software process handling communication with the network apparatus 3 or the management module 3a associated thereto, through one or more communication channels 24 (e.g. TCP connections). In particular, handlers 23 communicating with the network apparatuses 3 positioned in a specific geographic area can be joined in a single group ("handler group").

The adaptive controller 50 comprises a complete list of the handler 23 with associated information about:

- the current load, for example the average length of the queues of blocks of commands present within the handler;
- the expected load, obtained for example adding the incoming blocks of commands to the current load;
- the operational status, for example if the network apparatuses associated to the handler can receive the measurement request commands sent to them;
- the handler group whereto an individual handler is associated.

Each session 20 queries the adaptive controller 50 using some parameters, such as:

- the priority of the task whereto the session belongs;
- the group or the handler associated to the network apparatuses whereto the block of commands refers;

and receives as a reply the address of an appropriate and available handler.

Moreover, the adaptive controller 50 monitors:

- load balancing of the handlers belonging to a same group;
- fault tolerance between the handlers belonging to a same group;
- the status of the individual handlers.

As shown in FIGS. 4 and 5, at least two embodiments of the handlers 23 can be provided:

- apparatus handler 23a interfacing directly with the network apparatuses 3. In particular, each apparatus handler 23a interfaces a single network apparatus 3.
- an element manager handler 23b interfacing with the network apparatuses 3 through the related management modules 3a. Each element manager handler 23b can interface with a single management module 3a which, in turn, controls multiple network apparatuses 3.

In particular, each apparatus handler 23a/element manager handler 23b is configured for managing:

- compliance with the maximum number of communication channels 24 which can be used simultaneously on a single network apparatus 3/management module 3a (for instance maximum number of TCP connections on the network apparatus). Said limit derives from the specifications of the interfaces present on the network apparatus 3/management module 3a and from their possible use by other external applications;

multiple access by multiple sessions 20 (and hence tasks 19) to each network apparatus 3/management module 3a; and priority between the sessions 20 (and hence between the single tasks 19).

As shown in FIG. 4, the apparatus handler 23a comprises:

a channel dispatcher module 26 receiving in an asynchronous way the blocks of commands 21 arriving from the communication bus 22 and sends them to the related network apparatus 3 through appropriate queues 28 associated to the communication channels 24.

As shown in FIG. 5, the element manager handler 23b comprises:

an apparatus dispatcher module 27 which asynchronously receives the blocks of commands 21 arriving from all sessions 20 and queues them in appropriate queues 28 ("apparatus queues") differentiated by destination apparatus. A queue is provided for each network apparatus 3.

a channel dispatcher module 29 which continuously checks the queues 28 and, for each queue, determines the next block of commands 21 to be sent to the related management module 3a through the related communication channel 24.

The measurements obtained through queries on network apparatuses 3/management modules 3a are then stored in an appropriate database, not shown in the figures, which can be included or external to the analysis system 13.

Advantageously, the data access portion 18 thanks to a double access level (directed to the network apparatuses 3 or through the management modules 3a) combined with the management in blocks (of configurable dimensions) of the commands, allows an optimal calibration between:

management of the priorities. For this purpose, the use of blocks of commands 21 having small dimensions allows a faster reactivity of the application relative to the priorities;

overhead reduction. Blocks of commands 21 of greater dimensions allow a greater flow of data.

the reduction of bottlenecks inside the application because, in the case of the element manager handler 23b, the two dispatcher processes are executed in an independent way and with elementary operations and therefore with a low computational loading.

Both the handlers 23 and the adaptive controller 50 can implement rules/policies for the performance of their task. Said rules/policies generally take the form of mathematical formulas which, based on the input parameters associated to each block of commands 21 considered, provided a single value of priority related to the block of commands 21. For example, the block of commands 21 with the highest priority of value can be selected. A simple example of these formulas is a linear expression in which the precedence value is given by the sum of the input parameters weighted with appropriate multiplication factors.

The information acquisition module 14 is also provided with an interface, for instance of the FTP type, for accessing the network inventories 5 in order to periodically acquire the static network information contained therein, for example the configuration of each broadband transmissive system installed and active in the network, inclusive of a customer ID.

Moreover, the information acquisition module 14 can be provided with an additional interface towards commercial databases and/or other databases available to the network operator where are available the addresses of the user equipment 4 whereto the broadband services are associated.

The information processing module 15 is configured for obtaining from the processing of the network information acquired by the information acquisition module 14, a first and a second index $I_{sg}$, $I_{st}$, representing the quality status of the access network 2, and in particular its degree of saturation. These two indexes are respectively the geometric saturation index $I_{sg}$ and the transmissive saturation index $I_{st}$. Specifically, the geometric saturation index $I_{sg}$ is indicative of the degree of use of the cables in terms of broadband transmissive systems supported by the cables. The geometric saturation index $I_{sg}$ is a positive number, assumed to vary between 0 and 1. It is equal to one if the degree of use of the cables, in a determined network portion, reaches 100% in terms of pairs used in broadband transmission.

The transmissive saturation index $I_{st}$ is indicative of the transmissive status of the cables in terms of bit rate of the broadband transmissive systems supported by the cables. The transmissive saturation index $I_{st}$ is a positive number, assumed to vary between 0 and 1. It is equal to one if all broadband transmissive systems operating on the pairs present in a determined network portion reach the maximum possible bit rate.

Said indexes can be calculated for the entire access network 2, as well as for a specific portion thereof (for example, the one serving a metropolitan area), for a specific cable area ("Local Exchange") and for a single subscriber loop.

More specifically, to calculate the geometric saturation index $I_{sg}$ relating, for instance, to a specific network portion, the information processing module 15 obtains, starting from the information stored in the network inventories 5, the degree (or coefficient) of use of each area or sector of cable in the network portion in question. For example, if the network portion in question coincides with a primary link 6a of cable, included between a Main Distribution Frame 9 and a cabinet 11 (see FIG. 2), the degree (or coefficient) of use is characterised by identifying, accessing the network inventory 5, the type of broadband transmissive systems already installed and active for each pair of the primary cable link 6a in question, typically formed by a total of N pairs (e.g., N=100). Assuming M to be the number of broadband transmissive systems surveyed within the primary link 6a, with M equal to the summation of the components $m_i$ related to each type of broadband transmissive system present in the network:

$$M = \Sigma m_i \leq N$$

the index $I_{sg}$ is the result of the simple relationship M/N, hence:

$$I_{sg} = \frac{M}{N} \leq 1$$

the complement 1—M/N relates to the cable portion not currently involved by the presence of broadband transmissive systems and in which it can be assumed that new broadband transmissive systems will be installed in the future, according to the commercial development plans set by the network operator.

The transmissive saturation index $I_{st}$, related to the network portion in question, can be assessed starting from the transmissive parameters measured by the information acquisition module 14, on the broadband transmissive systems already installed and active in the network portion in question.

A methodology for assessing the transmissive saturation index $I_{st}$, for example, is based, in the case of ADSL transmissive systems, on the direct measurement (through the data access portion 18) of the current bit rate (CurrBitRate) and on the estimation of the maximum achievable value of bit rate (MaxBitRate).

In the case of ADSL transmissive systems, for example, the maximum achievable bit rate value (MaxBitRate), i.e. the achievable transmissive capacity, can be determined by integrating the Shannon capacity value obtained from the known relationship:

$$C = \log 2[1 + S/(L \cdot N \cdot 10^{\wedge}(0.1 \cdot \Gamma))]$$

along the frequency band used by ADSL transmissive systems.

In the previous relationship, in which for the sake of simplicity the dependence of each variable on the frequency f is not shown, S represents the transmitted signal, L the electrical length of each subscriber loop, included in the network portion in question, and N the noise present on the cable. In particular, the electrical length L introduces a loss on the transmitted signal S and directly depends on the electrical and topological characteristics of the distribution cable; the length L is estimated directly by the installed ADSL transmissive systems, through data access portion 18 and it is expressed, for example, as insertion loss. The noise N comprises a crosstalk component, generally predominant, which directly depends not only on the electrical characteristics of the cable, but also on the number of interfering transmissive systems present in the cable itself, so in practice N is correlated to the geometric saturation index $I_{sg}$. Lastly, the factor $\Gamma$ represents a loss factor, which generally depends on the specific implementation of the transmissive technology.

In the hypothesis that in the network portion in question are respectively present P, Q, R ADSL transmissive systems associated to three different types of service respectively characterised by a downstream data rate:

from at least 8000 kbit/s to 4832 kbit/s for the service P;
from at least 4800 kbit/s to 1280 kbit/s for the service Q;
from at least 1248 kbit/s to 800 kbit/s for the service R.

A similar classification can be made for the user-network (upstream) direction.

The transmissive saturation index of the network can be assessed as follows:

$$I_{st} = \frac{1}{P+Q+R}\left[P\frac{\sum_p CurrBitRate}{\gamma_1 \sum_p MaxBitRate} + Q\frac{\sum_q CurrBitRate}{\gamma_2 \sum_q MaxBitRate} + R\frac{\sum_r CurrBitRate}{\gamma_3 \sum_r MaxBitRate}\right]$$

The terms $\gamma_1$, $\gamma_2$ and $\gamma_3$ are conservative and corrective factors <1, typically dependent on the degree of interoperability between the transmissive systems considered and on the offered service, for example $\gamma_1 = \gamma_2 = \gamma_3 = 0.9$.

The information acquisition module 14 is also able to estimate the excess signal-noise ratio margin $SNRM_{excess}$ as the difference between the operating signal-noise ratio margin $SNRM_{operating}$ and a nominal value, predetermined according to the following relationship:

$$SNRM_{excess} = SNRM_{operating} - SNRM_{nominal}$$

The excess margin in signal-noise ratio $SNRM_{operating}$ should always be greater than the predetermined nominal value $SNRM_{nominal}$, typically 6 dB. The $SNRM_{operating}$ value is intrinsically linked, unless the system is implemented, to the real conditions of the line S/(L·N).

In particular, the transmissive saturation index $I_{st}$ of the network portion in question is all the smaller, i.e. the quality status of the network is all the better the greater the excess margin in signal to noise ratio $SNRM_{excess}$. In this case, the bit rate and hence the transmissive capacity of the individual ADSL line is greater than the measured current bit rate (CurrBitRate) and it is acquired by the analysis system 13 to be made available to the information processing module 15 as maximum achievable value for on line bit rate (MaxBitRate), except for a loss factor $\gamma_i$ depending on the degree of interoperability between the systems.

On the other hand, the network portion in question is saturated when most, or at the limit all ADSL transmissive systems operating therein, have no excess signal-noise ratio margin $SNRM_{excess}$, or conditions are observed in which said excess is reduced below the required nominal margin value, thereby becoming negative.

Figure 6:
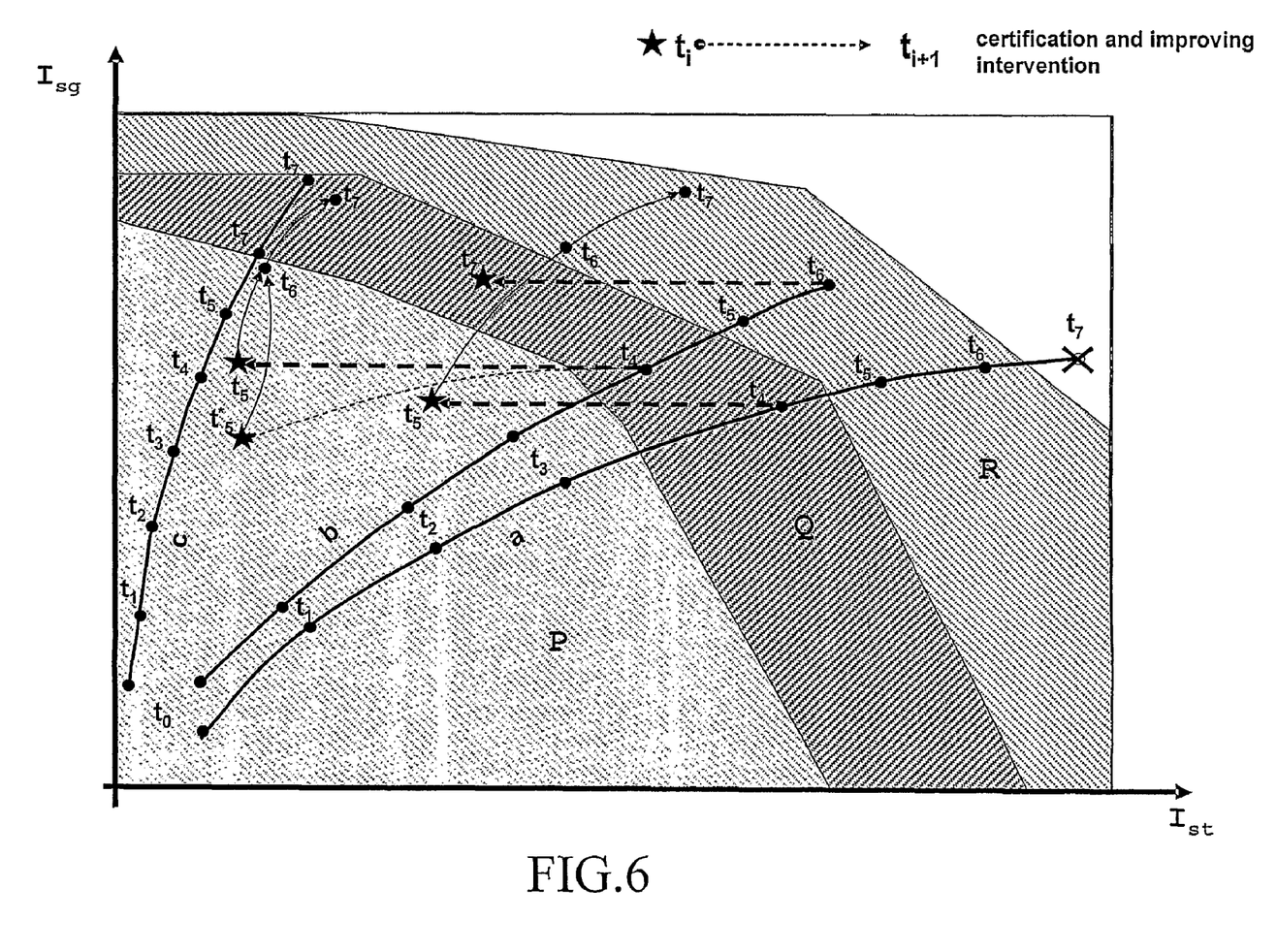
FIG. 6 shows a possible profile of quality indexes measured on the access network of FIG. 2.

With reference now to FIG. 6, the analysis system 13 is then able to determine the quality status Q of the network portion analysed in the plan $[I_{sg}, I_{st}]$ ($Q = [I_{sg}, I_{st}]$) in a punctual way, as time progresses and services are developed and advanced.

Specifically, starting from a step of acknowledging an initial quality status of the analysed network portion, measured for example at the time $t_0$: $Q_0 = [I_{sg}, I_{st}]t_0$, the analysis system 13 is then programmed to measure the quality status of the analysed network portion at different sampling times $t_1, t_2 \ldots t_n$, for example set one month or one week apart.

This measurement allows to follow the trend in transmissive capacity expressed as band in Mbit/s globally offered on the network portion in question at the sampling time $t_i$.

For example, if in the network portion in question are present the P, Q, R ADSL transmissive systems described above, the total band offered at the sampling time $t_i$ is given by the following relationship:

$$(B_{curr})_{t_i} = \left(P\sum_p CurrBitRate + Q\sum_q CurrBitRate + R\sum_r CurrBitRate\right)_{t_i}$$

whilst the excess band available is given by the following relationship:

$$(B_{execess})_{t_i} = \left(P\gamma_1 \sum_p MaxBitRate + Q\gamma_2 \sum_q MaxBitRate + R\gamma_3 \sum_r MaxBitRate\right)_{t_i}$$

In particular, the steps of acquiring and processing information, performed by the analysis system 13 can be carried out or programmed according to the needs of the network operator, the first step feeding the second one and vice versa, according to a learning process that is consistent with the planning of the base of installed broadband systems, of advancements in the services and of the technologies deployed in the field.

The quality status of the network is then made available to the operator through the interface module 16. The operator can use this information as an input parameter to network operation and planning processes to assess, for example:

the need to carry out improving interventions when a specific part of the network appears not to be inline with the average quality of the rest of the network, or the level of band which can be offered is found to be below service requirements;

alternatively, if the degree of saturation of the transmissive capacity is not due to a quality problem, the need for an infrastructural intervention aimed locally to introduce alternative access solutions, e.g. mixed copper-fibre architectures, to optimise the gradual introduction of new broadband access types and technologies.

For example FIG. 6 shows the expected profiles of the two indexes of geometric saturation $I_{sg}$ and transmissive saturation $I_{st}$ in relation to the development of ADSL transmissive services supporting the three different types of service P, Q, R indicated above. As stated previously, the three different types of service are respectively characterised by a data bit rate:

from at least 8000 kbit/s to 4832 kbit/s for the service P;
from at least 4800 kbit/s to 1280 kbit/s for the service Q;
from at least 1248 kbit/s to 800 kbit/s for the service R.

In particular FIG. 6 shows three hypothetical areas (or sectors) of cable (called a, b and c) whereto corresponds a different quality status Q, progressively rising and respectively low, medium and high. Regardless of the quality status Q, the transmissive saturation index $I_{st}$ tends to increase with increases in the geometric saturation index $I_{sg}$ by effect of the cross talk phenomena determined by the development of ADSL usage in the area in question. Depending on the quality of the cable, it may then occur that, on average, a certain service level can only be sustainable up to certain values of the geometric saturation index $I_{sg}$.

A typical case which may occur is that, in the case of a status (current or foreseeable) of the cable are that already exhibits low quality at very low degrees of use (see FIG. 6, cable area a), the offer of services drops, by effect of transmissive saturation, below 800 kbit/s for most users present in the area (cable area a, sampling time $t_7$). In this case, the analysis system 13 highlights that the area requires an intervention, which may entail enhancing the cable (replacement) or developing new network technologies and/or architectures assuring better performance.

In FIG. 6, and asterisk (*) identifies some improving interventions by the network operator. Once said improving interventions are completed, the analysis system 13 is then able to certify the intervention, appropriately evaluating it in terms of gain of transmissive capacity available in the network, with respect to the status preceding the improving intervention.

The analysis system 13 can advantageously also be applied to subscriber loop pre-qualification processes to be used to support new broadband services.

In this case, the analysis system 13 estimates the feasibility of providing a specific broadband service on a determined subscriber loop, used to connect a generic new user X.

The estimate is based on the analysis of the quality of the portion of access network 2 in the cable area whereto the subscriber loop to be pre-qualified belongs, i.e. on the calculation of the pair of saturation indexes $I_{sg}$, $I_{st}$ and also, when available, of the information about the quality of the subscriber loops already active on users, located in the immediate vicinity of the new user X. The Applicant has verified that the characteristics of transmissive capacity of a subscriber loop to be pre-qualified are similar, on average, to those present in the "neighbouring" subscriber loops, whereon a broadband service is already active. This allows directly to probe the transmissive quality present in the portion of access network 2 neighbouring the one in which the subscriber loop to be pre-qualified is located.

In practice, the analysis system 13 knowing the telephone number and the geographic position (or toponomastic address) of the new user X, is able, by accessing the network inventories 5, to identify the cable area whereto the subscriber loop to be pre-qualified belongs and, therefore, to assess the quality index Q=[$I_{sg}$, $I_{st}$] present therein.

If users are already active in the immediate vicinity of the new user X, i.e. there are users whose loops are attributed to the same cable area, and their locations are approximately situated without about 200 metres from the location of the new user X, for example using a map geo-referencing system, the analysis system 13 is able to measure the quality parameters of the loops attributed to them by the network inventories 5. Based on the measured data, the analysis system 13 applies an inference rule able to pre-qualify the subscriber loop in regard to the positive or negative feasibility of assigning to the user X a service requiring a transmissive band B. This rule can, for example, be the following:

a) in the cable area to be pre-qualified, the conditions $I_{sg}<\delta$ and $I_{st}<\beta$ must hold true, with the threshold values below one, for example $\delta<0.8$ and $\beta<0.8$.

b) simultaneously with the previous condition a), for the systems neighbouring the subscriber loop to be pre-qualified must also be:

$$\text{MaxBitRate} > (1+\alpha) \cdot B,$$

where the factor $\alpha$ can be an appropriate constant, for example $\alpha=0.15$, or a function of the indexes $I_{sg}$ and $I_{st}$, for example $$\alpha = I_{sg} \cdot I_{st}.$$

If no significant sample is available (directly observable or coming from the recent historical data stored within the analysis system 13) of measurements on lines neighbouring the loop to be pre-qualified, the analysis system 13 can still pre-qualify the loop attributed to the new user X based on the condition a), and also making a punctual estimate of the value of bandwidth B, based on the geographic position of the customer with respect to the central office (or its address). In this case, the analysis system 13 obtains from the network inventory 5 (or by accessing a geo-reference electronic cartography) the presumed length of the subscriber loop and estimates its electrical length L. For example, an estimated loop length of 1.5 km of cable with 0.4 mm diameter pairs translates into an electrical length L constituted, in the frequency domain, by the insertion loss function available and present in the network and xDSL transmissive system model 30 present within the analysis system 13.

More specifically, the network and xDSL transmissive system model 30 estimates the crosstalk noise level present in a generic cable area. A sample calculation of said estimate can be carried out by adding together the Near-End-Crosstalk component NEXT and Far-End-Crosstalk component FEXT of the noise present in the cable area itself.

The formulas of these two components can be found on page 62 of "Draft of American National Standard", "Spectrum Management for Loop Transmission Systems" Issue 2, ANSI T1E1.4 November 2002" where they are calculated for the case in which in the cable area of interest are present at least 2 or 3 different disturbing sources (such as xDSL, HDB3, ISDN systems, etc.) or based on the degree of use for the cable area in question known from the information stored in the network inventories 5. In any case, the extension of the two formulas to multiple disturbing sources is known to the person skilled in the art.

The band B available for assignment to the customers can thus be estimated by frequency integrating the known relationship:

$$C = \log 2[1 + S/(L \cdot N \cdot 10^{\wedge}(0.1 \cdot \Gamma))].$$

The results obtained by the analysis system 13 are then stored in the database 17 where they remain directly available to the application for any off-line statistical processing.

The advantages achievable with the system according to the invention are readily apparent from the above.

Moreover, it should be stressed that the analysis system 13 is able to activate, on the operator's request, extensive surveys or the punctual and time-based monitoring of specific data transmission lines (e.g. ADSL) to support assurance and delivery activities. In particular, the analysis system 13 is able to read the historical series of events such as Loss of Power or Loss of Sync and the error counters (CV, SES) or error correction counters (FEBE), or any unstable trends in physical layer parameters, such as the signal-to-noise ratio margin. This is particularly important in the typical case of a cable area in which the installed broadband transmissive systems are not always active but vice versa are activated only at specific times of day so that crosstalk noise in the cable is not stationary on a daily basis. In these cases, the analysis system 13, based on the outcome of the monitoring session and on the analysis of the historical series of the parameters, offers an indication on the quality of the connection. The operator can then decide the type of intervention to perform, for example whether the modem or the pair can be replaced (network upgrade). The historical readings also concur to establish the quality status of the cable area or the central office area where the monitored ADSL system is installed.

Lastly, it is readily apparent that the system described and illustrated herein can be subject to numerous modifications and variants, without thereby departing from the scope of the inventive concept, as defined in the appended claims.

For example, the analysis system 13 is applicable to any xDSL transmissive system, such as VDSL, SHDSL or future generations of ADSL technologies, such as ADSL2 and ADSL2+, that an operator can deploy on its network.

The analysis system 13 can also be used by a network or service operator who operates in a LLU ("Local Loop Unbundling") situation: i.e. the process of transferring the copper loops to other new operators by the incumbent operator) so that the complete database of the network structure is not directly accessible.

Moreover, the data access portion 18 can be used for any type of interaction with the network apparatuses 3. In particular the handler 23 can represent a generic gateway to the network that is independent of the type of commands to be sent to the network apparatuses.

The invention claimed is:

1. A system for a quality status analysis of an access network of a fixed network infrastructure, said access network comprising a plurality of cables, a set thereof supporting broadband transmissive systems, comprising:
    an information acquisition module configured for drawing static network information stored in first data sources and dynamic network information relating to said broadband transmissive systems from second data sources; and
    an information processing module configured for:
        collecting said static and dynamic network information from said information acquisition module; and
        processing said static and dynamic network information to obtain at least:
            a geometric saturation index indicative of a degree of use of said cables, wherein the geometric saturation index is based on a ratio of a quantity of cable pairs which support said broadband transmissive systems in at least a portion of the access network and a quantity of total available cables in said portion of the access network; and
            a transmissive saturation index indicative of a transmissive status of said cables in terms of a bit rate of said broadband transmissive systems supported by said cables.

2. The analysis system, as claimed in claim 1, wherein said dynamic network information comprises transmissive parameters associated with said broadband transmissive systems.

3. The analysis system, as claimed in claim 1, where said static network information comprises at least information about a structure of said access network.

4. The analysis system, as claimed in claim 1, wherein said second data sources comprises network apparatuses, each network apparatus being configured for handling traffic coming from the cables connected thereto.

5. The analysis system, as claimed in claim 1, wherein said first data sources comprise network inventories.

6. The analysis system, as claimed in claim 1, wherein said information acquisition module comprises an access interface to access said first data sources.

7. The analysis system, as claimed in claim 1, wherein said information acquisition module comprises a data access portion configured to access said second data sources.

8. The analysis system, as claimed in claim 7, wherein said data access portion comprises:
    a plurality of blocks of commands requesting a measuring of said dynamic network information associated with said broadband transmissive systems, said blocks of command being organised in parallel sessions, each session being associated with one or more data sources located in a specific portion of said fixed network infrastructure;
    a plurality of handlers, each handler being configured to handle communication with said one or more data sources by controlling communication channels associated with said one or more data sources; and
    an adaptive controller configured for selecting among said plurality of handlers to one whereto a specific block of commands included in a specific session is to be sent.

9. The analysis system, as claimed in claim 8, wherein each handler is configured for handling:
    compliance with a maximum number of communication channels which can be controlled simultaneously by a single data source;
    multiple access by multiple sessions to each data source; and
    the priorities between said sessions.

10. The analysis system, as claimed in claim 8, wherein at least a handler comprises an apparatus handler configured for accessing the respective data source directly, said apparatus handler comprising a channel dispatcher to receive said blocks of commands from a communication bus, queue them in appropriate queues and send them to said data source through the communication channels managed by said data source.

11. The analysis system, as claimed in claim 8, wherein said at least one handler comprises an element manager handler configured for accessing one or more data source through a management module of said data source, said element manager handler comprising;
    an apparatus dispatcher module to receive blocks of commands from a communication bus and queue them in appropriate queues differentiated by destination data source; and
    a channel dispatcher module to check said queues and, for each queue, determine the next block of commands to be sent to the related management module, through the communication channels managed thereby.

12. The analysis system, as claimed in claim 8, wherein said adaptive controller comprises a list of handlers.

13. The analysis system, as claimed in claim 1, comprising an interface for accessing a network operator.

14. The analysis system, as claimed in claim 1, comprising a database in which are stored a results obtained by the analysis system.

15. A method for a quality status analysis of an access network of a fixed network infrastructure, said access network comprising a plurality of cables, a set thereof supporting broadband transmissive systems, comprising the steps of:
- accessing said first data sources to draw static network information stored in said first data sources;
- accessing said second data sources to draw dynamic network information associated with said broadband transmissive systems; and
- processing said static and dynamic network information to obtain at least:
  - a geometric saturation index indicative of a degree of use of said cables, wherein the geometric saturation index is based on a ratio of a quantity of cable pairs which support said broadband transmissive systems in at least a portion of the access network and a quantity of total available cables in said portion of the access network; and
  - a transmissive saturation index indicative of a transmissive status of said cables in terms of a bit rate of said broadband transmissive systems supported by said cables.

16. The method as claimed in claim 15, wherein said step of remotely accessing said second data sources to draw dynamic network information associated with said broadband transmissive systems comprises the steps of:
- generating a plurality of blocks of commands requesting to measure said dynamic network information associated with said broadband transmissive systems;
- organising said blocks of commands in parallel sessions, each session being associated with one or more data sources located in a specific portion of said fixed network infrastructure; and
- sending a specific block of commands included in a specific session to a specific data source located in said specific portion of said fixed network infrastructure.

17. The method, as claimed in claim 16, wherein said step of sending a specific block of commands included in a specific session to a specific data source located in said specific portion of said fixed network infrastructure comprises the steps of:
- querying a communication bus configured for receiving said blocks of commands and selecting among a plurality of communication handlers one whereto said specific block of commands is to be sent, each handler being configured to handle communication between said communication bus and said one or more data sources by controlling communication channels managed by said data sources.

18. The method, as claimed in claim 15, wherein said steps of accessing first and second data sources comprise a step of repeatedly accessing said first and second data sources.

19. The method, as claimed in claim 18, wherein said step of repeatedly accessing said first and second data sources comprises a step of periodically accessing said first and second data sources.

20. A fixed network infrastructure, comprising an access network comprising a plurality of cables, a set thereof supporting broadband transmissive systems, and a system for analysing the quality status of said access network implemented according to claim 1.

* * * * *

UNITED STATES PATENT AND TRADEMARK OFFICE
CERTIFICATE OF CORRECTION

PATENT NO.       : 8,005,018 B2                                    Page 1 of 1
APPLICATION NO.  : 10/593969
DATED            : August 23, 2011
INVENTOR(S)      : Magnone et al.

It is certified that error appears in the above-identified patent and that said Letters Patent is hereby corrected as shown below:

\*       Title Page, Item (57), in the Abstract, lines 11-13,
"dynamic network information from the information acquisition module, and process the static and dynamic network information to obtain an index" should read --dynamic network information to obtain an index--.

Claim 4, column 14, line 16, "sources comprises" should read
--sources comprise--.

Claim 11, column 14, line 59, "one or more data source" should read
--one or more data sources--.

Claim 11, column 14, line 61, "comprising;" should read --comprising:--.

\*       Claim 14, column 15, line 8, "stored a results" should read
--stored results--.

\*       Claim 15, column 15, line 13, "accessing said first data sources"
should read --accessing first data sources--.

\*       Claim 15, column 15, line 15, "accessing said second data sources"
should read --accessing second data sources--.

Signed and Sealed this
Twenty-sixth Day of March, 2013

Teresa Stanek Rea
*Acting Director of the United States Patent and Trademark Office*